2,885,258

United States Patent Office

Patented May 5, 1959

2,885,258

RECOVERY OF URANIUM FROM DILUTE URANIUM-CONTAINING SOLUTIONS

George W. Bain, Amherst, Mass., assignor to the Trustees of Amherst College, Amherst, Mass., a body corporate of Massachusetts No Drawing. Application October 22, 1953
Serial No. 387,785

5 Claims. (Cl. 23—14.5)

This invention relates to the recovery of uranium and, more particularly, to the recovery of uranium from dilute uranium-containing solutions.

A major object of the invention is the provision of an economically feasible method for the quantitative separation of uranium from uranium-containing solutions wherein the recoveries correspond to the difference between the initial uranium content of a solution and a final depleted uranium solution content which is often well below 1 part per million by weight and is oftentimes undetectable. This renders the process useful in the treatment of solutions which originally contain no more than 1 part per million of uranium by weight since 85 to 95% and above recoveries even from these solutions have been attained.

Though uranium recovery by the methods of this invention to any depleted solution content is considered to be novel, the greatest value of the invention, in the light of previous attempts, lies in its effective depletion of uranium-containing solutions to concentrations less than 1 part per million. Such extensive depletion has rarely been obtained even in the laboratory, and then only by resort to expensive organic reagents. Existing commercial forms of recoveries do not, to my knowledge, economically justify continuation of solution depletion to any such low point as even 1 part per million. Consequently, any solution which does not far exceed, in its initial uranium content, even 2 parts per million is discarded today as possible source material. Normal sources now used require initial uranium contents of the order of 100 parts per million and the concentration process is not commercially utilized beyond recovery to a dilution of somewhere in the neighborhood of 20 parts per million. The limitations of these processes thus impose a serious restriction upon available source materials and is the cause of today's intensive and unduly expensive search for high content source material. On the contrary, my process, while perfectly adapted for use in the treatment of present-day commercial sources with equal or greater recovery, is adapted, in addition, for utilization with many other source materials which occur in great natural abundance, since quantities of mineral-bearing solutions contain uranium in amounts of the order of 1 to a few parts per million. Among these are sulfate leach solutions from black shales (40 parts per million), from granites formed from magmas saturated with uranium (3 parts per million), mine waters from the Witwatersrand, from the Arizona uranium province, Northern Rhodesia and the Katanga and sulfate leach solutions from the waste dumps of vanadium extraction plants on the Colorado plateau, to say nothing of sea water itself (0.36 to 1.4 parts per million depending upon location).

The invention has as further objects the provision of methods for the concentration and separation of uranium from dilute uranium-containing solutions having one or more of the following advantages: avoidance of costly procedures and costly reagents; high recovery within reasonable operation times; and concentration to useful values.

The invention, in its broad aspect, comprises the separation of the uranium content of solutions containing uranium compounds in water-soluble or otherwise inseparable colloidally-suspended form, by conversion of the uranium into compounds or complexes of such less solubility or greater aggregation as to permit their separation from the solution, preferably by simple precipitation, sedimentation or filtration, and utilizes, as conversion reagents, inorganic chemical materials which can be of natural origin, are abundant and are distributed widely throughout the world.

These reagents consist of the relatively water-insoluble compounds containing any one or more of the chemical elements, phosphorous, vanadium, columbium, and tantalum, falling within the +5 series of group V of the periodic table, preferably, the water-insoluble salts of their oxy-acids including, particularly, the water-insoluble phosphates. Such compounds are listed in the following table:

*Table of typical useful phosphate and vanadate compounds in their ortho, pyro or hypo and meta forms* a. H-ion type
   Calcium (mono- and di-)
   Barium (mono- and di-)
   Strontium (mono- and di-)
   Magnesium (mono- and di-)

b. Calcium type
   Calcium
   Barium
   Strontium
   Magnesium c. Heavy metals and metalloids
   Bismuth
   Cadmium
   Chromium
   Cobaltous
   Cupric
   Lead
   Manganous
   Mercurous
   Mercuric
   Nickel
   Silver
   Stannous
   Basic stannic
   Zinc d. Trivalent group
   Ferric
   Aluminum e. Rare earths
   Cerium
   Thorium Such compounds, in proper physical form as hereinafter described, have been found to exhibit high specific precipitant characteristics with respect to uranyl and uranic compounds permitting high recoveries and useful concentrations.

Under some circumstances, compounds of the above type are formed by the addition of more soluble phosphorous, vanadium, columbium or tantalum compounds to natural uranium-containing mineral solutions which also contain cations which react with the soluble compound or its acid to form one or more of the above relatively water-insoluble compounds in the solution. Thus, for example, the anhydrides, phosphorous pentoxide and vanadium pentoxide, as well as the ammonium, sodium, potassium and lithium alkali salts (including their mono- and di-forms), are sometimes useful since the oxides react in the solution to form the corresponding acids which, in turn react with cations available in the solutions (e.g. calcium, in sea water) to form insoluble phosphate or vanadate salts; while alkali salt solutions become flocculent in the presence of any calcium type or metal cation, originally present (as in sea water) or intentionally added. In similar manner, limitedly soluble phosphorous and vanadium compounds are effective even in the absence of water insolubilizing cations when used in excess over and above their solubilities, though such procedure can involve substantial loss of precipitant and reduction in recovery values because of too fine sub-division of a substantial portion of the uranium phosphorous reaction product.

Recoveries resulting from treatment with water-soluble compounds of these four elements are thus dependent upon creation of sufficient flocculation in the solution to permit ready separation of insoluble reaction products, either by reason of partial or total conversion of the soluble compounds in the solution to insoluble compounds prior to their reaction with uranium, or by reason of their presence as residues in excess of saturation.

The preference is, however, to use water-insoluble compounds. In particle form of suitable mesh size, such water-insoluble phosphorous-containing compounds as animal or fish bone, naturally occurring mineral phosphates, e.g., wavellite from tropical deposits, or vanadates, e.g., metahewettite from the Monument No. 2 Mine in Arizona, when contacted with dilute uranyl or uranic salt solutions, will exhibit in a relatively short time even at room temperatures a greenish-yellow surface deposition or adsorption of accumulated uranium compound. Similarly, suitably finely divided insoluble compounds of vanadium, columbium and tantalum, for example, the calcium salts of these elements, will act in the same way, though obviously the scarcity and cost of columbium and tantalum compounds render their use inexpedient in view of the satisfactory results obtained with the commoner vanadium, and particularly with the abundant phosphorous compounds.

In the case of phosphates, the presence of halogens in the solutions being treated has been found to have some adverse effect on the percentage of uranium which can be accumulated in and on the precipitant. It is likely that the tendency of halogens to crystallize phosphates is responsible for a progressive lessening of the precipitant efficacy of phosphates on uranium. This is consistent with the fact that fossil bone or other crystalline phosphates such as Staffelite and Dahlite are not nearly as efficient in total recovery as fresh animal bone. Apparently, during deposition of the uranium which, in the case of animal bone, takes the form of insoluble uranyl phosphate, there is at any one instant more phosphate in ionized or other form available to the uranyl ion in amorphous or micro-crystalline structures such as are present in fresh animal bone than in crystalline structures. This can be visualized as being a consequence of the lesser rate to solution of crystallized phosphates. In any event, the rate of deposition from halogen-containing solutions begins to decrease rather rapidly before high recovery is secured unless fresh amounts of phosphate precipitant are periodically added or unless there is intervening regeneration of the precipitant to overcome the inhibiting effects arising from continued contact of the precipitant with halogens.

In the case of sea water, the retarding halogen effect is overcome either by intermittent addition of small increments of precipitant or by re-grinding the precipitant-precipitate in halogen-free water saturated with carbon dioxide and then using the re-ground precipitate until it is enriched to the desired or economic uranium content. The re-grinding procedure has the advantage that the weight of the deposited uranium is increased without increasing the weight of the accumulator. If fresh precipitant is used, proportions of uranium to the accumulator remain undesirably low.

Similar procedure can be followed with vanadium precipitants when contacted with halogen-containing solutions.

Alternatively, of course, care may be exercised to select only substantially halogen-free uranium solutions for treatment. Many ores from which other metals such as gold and radium have been extracted have uranium in the waste which can be leached with sulphuric acid at pH 4 to 5 to produce hexavalent uranium sulfate solutions having halogen contents of no detrimental consequence to a subsequent treatment according to this invention. Uranium in the form of uranates is generally insoluble but such uranium atoms are readily reduced to hexavalent form merely by operating at a pH less than about 8. Precipitations are preferably carried out at a pH of from 2 to 8.

A variety of methods for accomplishing the treatment and separation of the precipitant-precipitate mixture may be utilized. In addition to mere batch agitation followed by sedimentation and decantation, filtration or centrifugation, the process of this invention is susceptible to continuous operation by percolating the solution to be treated through a prepared filter bed of the precipitant in percolant size in the manner of common water-softening treatments, or by an adaptation of the present-day mineral separation techniques involving turbulent flow of mixed precipitant and solution towards a settling basin.

The following exemplify specific treatments for attaining recoveries in accordance with this invention:

EXAMPLE I

*Recovery from uranyl sulfate solution containing 4 parts uranium per million by weight*

To 4 liters of an aqueous solution containing 4 parts per million by weight of uranyl sulfate, there was added 10 grams of animal bone which had been previously burned at 400° C. to rid it of organic matter and some carbon dioxide and then pulverized to less than 0.149 millimeters diameter. The mixture was continuously agitated at room temperature for one hour and then allowed to sediment for half an hour. The supernatant fluid was decanted and tested for uranium. Four-liter additions of solution to the sediment were made for a total of eight cycles of the above process. Average uranium content of the decanted fluid was 0.56 parts per million. The recovered sediment weighed 7.71 grams and contained by assay 89.5 milligrams of uranium for a content of 1.16% uranium and a recovery of 87.5%. Increase in the number of cycles increases proportionately the uranium content of the recovered sediment. The uranium remaining in the supernatant was for each cycle as follows:

TABLE 1

| Charge | Loss of Uranium in Effluent |
|---|---|
| Mgs. | Mgs. |
| 4.01 | 0.42 |
| 4.01 | 0.24 |
| 4.01 | 0.20 |
| 4.01 | 0.26 |
| 4.01 | 0.40 |
| 4.01 | 0.87 |
| 4.01 | 1.10 |
| 4.01 | 1.015 |
| 8/4.505 | |
| average | 0.563 |

This calculates to a loss of $$\frac{.563}{4.01}$$

mgs. or 14.4%—checking within test error the 87.5% assay recovery.

EXAMPLE II

*Recovery from sea water containing 1 part uranium per million*

To four liters of sea water containing 1 part per million of uranium, there was added 50 grams of fresh animal bone pulverized to less than 0.149 millimeters diameter. The mixture was agitated at room temperature for one hour and then allowed to sediment for one-half hour. The supernatant liquid was decanted from the sediment and tested for uranium content. Four liters of sea water were added to the sediment and the operations were repeated. The procedure was repeated until 48 liters of sea water containing 48 mgs. of uranium had been treated. The decanted liquid had the uranium reduced to 0.094 parts per million for a total residue in effluent solution amounting to 4.51 mgs. or 9.4%; 42.18 grams of sediment contained 40.45 mgs. of uranium for a recovery in the sediment at content 0.096% uranium or 84.3% of the uranium occurring in the sea water. (The remaining 6.3% of uranium unaccounted for is adsorbed on the glass containers and is recoverable in laboratory procedure by acid washing but would merely accumulate in an industrial operation.)

EXAMPLE III

*Recovery from sea water containing 1.06 parts uranium per million by weight*

To four liters of sea water containing 1.06 parts per million of uranium, there was added 15 grams of fresh animal bone pulverized to less than 0.149 millimeters diameter. The mixture was agitated at room temperature for one hour and then allowed to sediment for one-half hour. The supernatant liquid was decanted from the sediment and tested for uranium content. Four liters of sea water and one gram of fresh animal bone pulverized to less than 0.149 millimeters diameter were added to the sediment and the operations were repeated. This second procedure was repeated until 92 liters of sea water containing 97.52 mgs. of uranium had been treated. The decanted liquid had the uranium reduced to 0.485 parts per million for a total residue in effluent solution amounting to 44.62 mgs. or 48.5 percent; 33.5 grams of sediment contained 49.66 mgs. of uranium for a recovery in the sediment at content 0.148% uranium of 51% of the uranium occurring in the sea water.

EXAMPLE IV

*Recovery from uranyl sulfate solution containing 2.01 parts uranium per million*

A 25 centimeter thick filtration bed made of burned bone of the type used in Example I crushed to between 0.208 and 0.417 millimeters in diameter was contained in a 4 cm. diameter glass tube. A uranium sulfate solution containing 2.01 parts of uranium per million of solution was prepared from Katanga radium ore. During 27¾ hours, 24.22 liters of this solution passed the filter for an average rate of 0.1825 liters per hour per square centimeter of filtration surface. The effluent solution contained 0.083 parts per million of uranium reflecting a 96% extraction. Principal uranium precipitation was in the first 3 centimeters of the filtration bed. Continuation of the filtration ultimately stops percolation by which time uranium phosphate fills the space between granules and uranium content exceeds 10% uranium in the cemented part of the filter bed.

EXAMPLE V

*Recovery from sea water containing 0.28 parts uranium per million*

80.2 liters of sea water from New Haven, Connecticut, containing 0.28 parts of uranium per million was passed through a filter bed prepared as in Example IV for 174½ hours at 0.0963 liters per hour per square centimeter. The effluent solution contained 0.066 parts of uranium per million indicating a 76.4% recovery.

EXAMPLE VI

*Recovery from uranyl sulphate solution containing 7 parts uranium per million*

A 0.5 centimeter thick filtration bed made of vanadium pentoxide and ammonium metavanadate powder of near micron size prepared by heating ammonium vanadate until the ammonia was driven off was contained in a 4 cm. glass tube. A total of 11 liters of uranyl sulphate solution containing 7 parts of uranium per million was passed through the filter in 700 hours at the rate of 0.00125 liters per hour per square centimeter. (Slow percolation is due to the extreme minuteness of the $V_2O_5$ particles prepared in this manner.) The effluent contained 1.25 mgs. of uranium indicating an extraction of 98.75% in the form of uranium vanadate.

In the case of agitation and turbulent flow methods, the amount of precipitant is regulated so that sufficient precipitant is used to secure high solution depletion without too low content of uranium in the precipitant-precipitate compound. As previously described, the degree of uranium concentration in the end product may be improved by repeatedly re-grinding and re-using the precipitant, each re-grinding exposing new surface areas. In the case of sea water, the amount of precipitant should be somewhere between 5 and 50 grams per 4000 cc. (.00125–.0125%) where the agitation period is one hour. Necessarily, however, there is always a compromise between having enough precipitant to give complete precipitation and having the minimum amount that will give high final uranium content in the accumulator.

The mesh size of the precipitant in the case of agitation should be as fine as is consistent with a desirably fast rate of sedimentation.

With respect to filter bed procedures, as is generally understood in the case of such procedures, the precipitant should have the finest mesh size that is consistent with satisfactory flow rates and the amount used is determined solely by the desired thickness of the bed. Since the accumulation in the filter bed commences at the inflow area and progresses inwardly relative to the filter bed, the amount of precipitant present is taken care of automatically by the thickness of the bed and the limitation is only that there is no need of using so much precipitant that the egress area of the bed does not have any substantial recovery before the accumulation at the inflow area is so great as to retard the rate of flow below that which is practicable.

With respect to the use of burned bone, experience has shown that rates of recovery from substantially halogen-free solutions can be maintained for a longer period with the use of burned bone. Where, however, there is as much halogen present as there is in sea water, the burning of the bone tends to cause the precipitant to pick up halogen even more readily, probably because in burning bone there is some loss of carbon dioxide converting the normal calcium carbonate of fresh animal bone $3[Ca_3(PO_4)_2]CaCO_3$ to calcium oxide which appears to react more readily with the halogens than does the calcium carbonate-containing bone. Hence, fresh animal bone is preferred for sea water use and burned animal bone for use with solutions of less halogen content derived from ores.

The uranyl phosphate deposits often are of yellow, greenish-yellow and black colors, indicating a combination of $Ca(UO \cdot O)_2(PO_4)_2 \cdot 8H_2O$;

$$H_2(UO \cdot O)_2(PO_4)_2 \cdot 8H_2O$$

and some uranite $(UO_2 \cdot UO_3)$.

End products of this process have uranium contents by weight far exceeding the grade of uranium deposits which have been found only by intensive search in limited quantity and at widely separated points, even the most favorable natural uranium products from extensive deposits have no more than .02% of uranium. End products having uranium contents of the order of about 0.15% or more when attained so readily from sea water or other waste material with a thousand-fold increase in concentration are phenomenal.

Hence, the process of this invention is regarded as solving the immediate problem of finding adequate uranium materials containing at least about one part per thousand of uranium. It also offers a uranium recovery process having potential large scale recovery at costs per unit weight of uranium that are a mere fraction of those of present-day processes.

I claim:

1. The method of quantitatively recovering uranium from solutions containing soluble uranyl sulphate salts which includes the steps of intimately contacting the soluble uranium salt solution at acid pH with animal bone in finely divided form and accumulating uranium on said bone from said solution in the form of insolubilized uranyl phosphate to a content of at least about 1% by weight, while depleting the uranium content of said solution to less than one part per million or less than 15% of the original maximum content of said solution, whichever value is lower.

2. The method as claimed in claim 1, wherein the bone is burnt bone.

3. The method as claimed in claim 1, wherein the uranyl salt solution is agitated with the bone, and including the steps of then drawing off the uranium depleted solution and successively agitating the bone with fresh quantities of uranyl sulphate solution to enrich the uranium content of the bone.

4. The method as claimed in claim 3, wherein the bone is reground to expose fresh surface areas thereof between each successive addition of solution.

5. The method of quantitatively recovering uranium from sulphuric acid leach solutions of uranium-containing ores containing soluble uranyl sulphate comprising percolating the uranyl sulphate solution at acid pH through a confined pulverulent bed of animal bone pulverized to percolant size and depleting the uranium content of said solution, by accumulation of uranium on said bone in the form of insolubilized uranyl phosphate to a value of less than one part per million or less than 15% of its original content, whichever value is lower, upon emergence from said bed, and continuing to feed said solution to and through said bed until the bone contains a uranium content exceeding 10% by weight.

References Cited in the file of this patent
UNITED STATES PATENTS
1,070,313 Adams _____ Aug. 12, 1913

OTHER REFERENCES

Journal of Biological Chemistry, vol. 179 (1949), pp. 333, 342.

Chemical Abstracts, vol. 45 (1951), column 78g; vol. 48 (1954), column 1209g (abstract of a British publication dated 1952).